Feb. 10, 1942. G. C. FIELDS 2,272,403
MIXING VALVE
Filed June 10, 1939
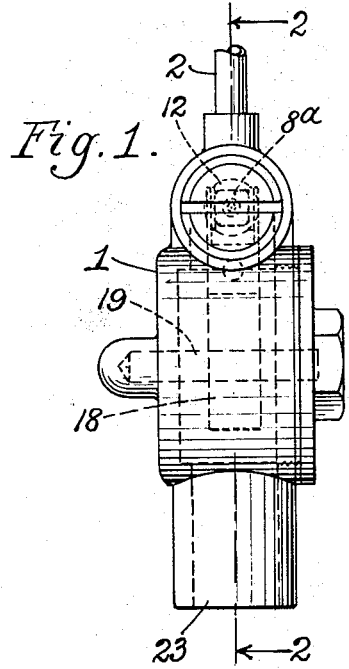
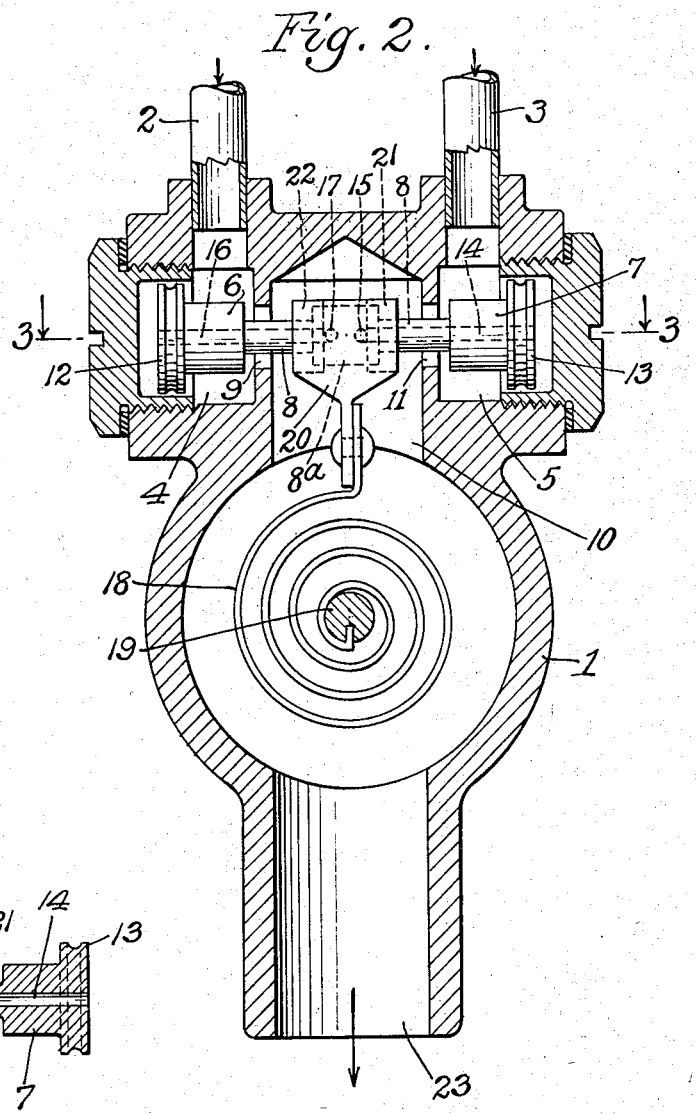
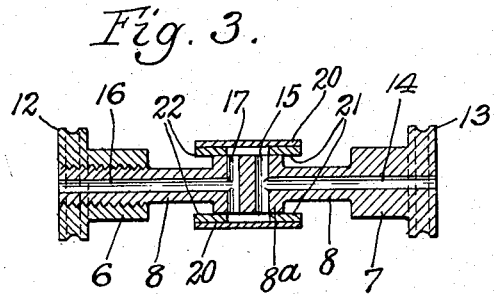
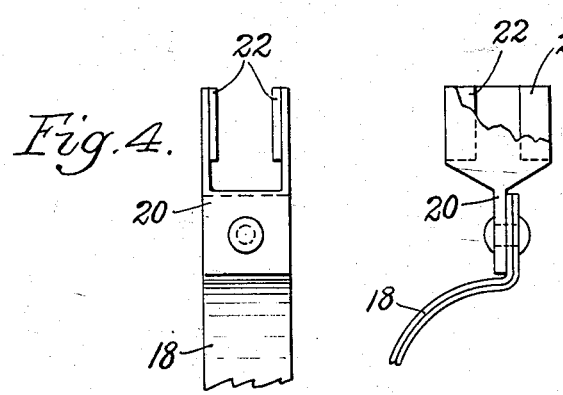
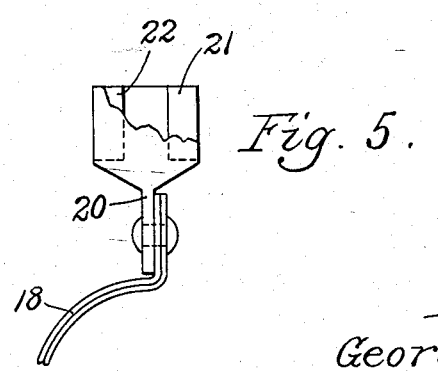
Inventor.
George C. Fields.
by Parker & Carter
Attorneys.

Patented Feb. 10, 1942

2,272,403

UNITED STATES PATENT OFFICE 2,272,403

MIXING VALVE

George C. Fields, South Bend, Ind., assignor to The Dole Valve Company, Chicago, Ill., a corporation of Illinois Application June 10, 1939, Serial No. 278,541

2 Claims. (Cl. 236—12)

This invention relates to mixing valves and has for its object to provide a new and improved device of this description.

The invention has as a further object to provide a mixing valve for mixing hot and cold liquids, so as to maintain the mixed liquid at substantially a predetermined temperature for which the device is set. The invention has as a further object to provide a mixing valve for mixing hot and cold liquids to provide a mixture of a predetermined temperature and which valve will not be affected by pressure differentials and temperature changes.

The device is particularly adapted for use where it is essential that the temperature of the mixed water be kept substantially at some given temperature without any substantial variation therefrom and is particularly adapted for use in delivering water to washing machines for washing materials which might be injured by a variation in the temperature of the water. It is also particularly adapted for use in connection with bath tubs and the like.

The invention has as a further object to provide a mixing valve wherein the movement of the valve member is not directly controlled by the thermostat, but is indirectly controlled thereby. The invention has as a further object to provide a mixing valve wherein the movement of the valve member which controls the admission of the hot and cold liquid, is brought about by the liquid itself, so that the thermostat is entirely relieved of the work necessary to move this control valve. The invention has further objects which are more particularly pointed out in the accompanying description.

Referring now to the drawing, Fig. 1 is a view showing one form of device embodying the invention;

Fig. 2 is a sectional view taken on line 2—2 of Fig. 1;

Fig. 3 is a view of the liquid controlling member separate from the casing and shown in section;

Fig. 4 is a view of the control member attached to the thermostat; and

Fig. 5 is a view of Fig. 4 as seen at right angles from the position shown in said figure.

Like numerals refer to like parts throughout the several figures.

Referring now to the drawing, there is provided a casing 1 having inlets 2 and 3, one for hot water, as, for example, the inlet 2, and one for cold water, as, for example, the inlet 3. In the casing is a chamber 4 with which the inlet 2 comunicates and a chamber 5 with which the inlet 3 communicates. Within the chamber 4 is a valve member 6 and within the chamber 5 is a valve member 7. These valve members are connected together by the connecting member 8. The valve member 6 controls a port 9 leading to the mixing chamber 10. The valve member 7 controls a port 11 which also leads to the mixing chamber 10. Connected with the valve members 6 and 7 are the valve controlling pistons 12 and 13. These valve controlling pistons work in the chambers 4 and 5 and are of such size that the water can leak past them.

There is a passageway 14, which extends through the valve member 7, the piston 13 and the connecting member 8 and which extends to the middle portion of this connecting member, which is provided with an opening 15 for the escape of the water. There is a passageway 16 which extends through the valve member 6, the piston 12 and to the center part of the connecting member 8 to the opening 17 therein. Within the mixing chamber is a thermostatic device which as herein shown consists of the coil 18 of thermostatic bimetal, which has one end fastened to a fixed part 19 connected with the casing 1, the other end of this coil being provided with a member 20 which has the two separated members 21 and 22 which are on opposite sides of the flat part 8a and in proximity to the openings 15 and 17.

The use and operation of my invention are as follows:

When the device is in operation, the hot water, for example, passes through the port 9 into the mixing chamber 10 and the cold water passes through the port 11 into the mixing chamber. The hot water also passes through the passageway 16 and out of the opening 17 into the mixing chamber and the cold water passes through the passageway 14 and through the opening 15 into the mixing chamber. If the temperature of the mixed water which surrounds the coil 18 changes, the thermostat moves the members 21 and 22 with relation to the openings 15 and 17, so as to partially close one of said openings, depending upon the direction of change of the temperature. If the opening 15, for example, is partially closed, this partially stops the flow of cold water through the passageway 14 and increases the pressure on the end of the piston 13, so that this piston and the valve members 6 and 7 and the piston 12 are moved to the left. This partially reduces the opening of port 11 and increases the opening of port 9. This decreases the amount of cold water entering the mixing chamber and increases the amount of hot water entering the mixing chamber. If the temperature in the mixing chamber rises above a predetermined point, the members 21 and 22 are moved so that the member 22 closes the opening 17 and opens up the opening 15. This reduces the flow of water through the passageway 16, thereby increasing the pressure on the end of the piston 12 and this causes the piston 12, valve members 6 and 7 and piston 13 to move to the right, thereby reducing the opening of the port 9 and increasing the opening of port 11, so as to decrease the amount of hot water and increase the amount of cold water flowing into the mixing chamber 10. The mixed water passes out the discharge opening 23 of the casing.

It will be seen that in this device the thermostat does not directly move the water controlling parts, but controls them indirectly, the movement of these parts being brought about by the pressure of the liquid itself. It will further be noted that in this device there is no increase in power of work required of the thermostat as the device, the movement of which it controls, increases in size or weight. In other words, a piece of bimetal having very little strength, can cause the movement of large devices, the movement of which requires great force.

I claim:

1. A mixing valve comprising a casing, said casing being provided with two inlets, one for hot liquid and the other for cold liquid, two separate chambers, one for each inlet, a piston in each chamber, a valve member in each chamber connected with one side of the piston therein, each chamber being provided with a port through which liquid flows from the chamber, said pistons loosely fitting in said chamber so that liquid flows past them and into contact with the face opposite that to which the valve members are connected, a connecting member connecting the pistons and valve members together, escape passageways extending through said pistons and valve members and the member connecting them together, a controlling device for said escape passageways and a thermostat for moving said control device to inversely control the amount of liquid escaping from said escape passageways.

2. A mixing valve comprising a casing, said casing being provided with two inlets, one for hot liquid and the other for cold liquid, separate ports through which the hot and cold liquids pass to the interior of the casing, two valve members connected together for controlling said ports, a connecting member extending between and connecting said valve members, a pressure receiving part associated with each valve member, acted upon by the liquid entering the casing and past which liquid flows, passageways leading from the outer faces of said pressure receiving parts partway through said connecting member, two openings in the connecting member one leading to each of said passageways, a control member for controlling either of said openings to reduce its size, and a thermostat connected with said control member, for moving it responsive to temperature to control the size of either passageway, to cause the liquid to move said valve members to simultaneously reduce the size of one port and increase the size of the other port.

GEORGE C. FIELDS.